UNITED STATES PATENT OFFICE.

JAMES TAYLOR, OF SOUTH DARTMOUTH, MASSACHUSETTS.

IMPROVEMENT IN LIQUIDS FOR FLUID GAS-METERS.

Specification forming part of Letters Patent No. 28,617, dated June 5, 1860.

*To all whom it may concern:*

Be it known that I, JAMES TAYLOR, of South Dartmouth, in the State of Massachusetts, have invented and discovered a new and useful Liquid to be Applied to Wet Gas-Meters, of which I hereby declare the following is a full and exact description.

The invention consists in the preparation of ordinary sea-water by removing from it all crystallizable salts and concentrating it to a certain point, which will be more particularly detailed in the following description.

Ordinary sea-water has specific gravity of 1.029 to 1.030. One thousand parts of the water contain 25 parts chloride of sodium or common salt; 5.30, sulphate of magnesia or Epsom salts; 3.50, chloride of magnesium; .20, carbonate of lime and magnesia; .10, sulphate of lime.

The sea-water may be concentrated in any usual manner by solar heat, as is practiced along the sea-coast, till Baumé's hydrometer immersed in the mother-water stands at 30°. This solution contains chiefly chloride of magnesium, chloride of sodium, and a trace of sulphate of magnesia. The solution at this degree of concentration resists frost at very low degrees of temperature. Thus the mother-water of the salt-works on the coast near New Bedford, after concentration to the degree above mentioned, was exposed to the cold of the open air of that climate for two successive winters without freezing. No special skill is required in concentrating the brine, although it is better to do it with solar than by artificial heat.

It is desirable to obtain the above degree of concentration, as that secures about sixteen per cent. chloride of magnesium, about four of chloride of sodium, and two of sulphate of magnesia, and then this liquid is in a fit state to be used as a substitute for water in the wet meter.

Having described the nature of the invention and the means of applying it to use, I do not claim the use of chloride of magnesium by itself; but

What I claim as my invention, and desire to secure by Letters Patent, is—

The use of the bittern or mother-water left after extracting the crystallizable salts from sea-water for filling wet gas-meters, all in the manner and for the purpose substantially as set forth.

JAMES TAYLOR.

Witnesses:
ABNER R. TUCKER,
LEMUEL BARKER.